United States Patent
Omokawa et al.

(10) Patent No.: US 12,306,578 B2
(45) Date of Patent: May 20, 2025

(54) HYDROPHOBIC SILICA POWDER AND TONER RESIN PARTICLE

(71) Applicant: FUSO CHEMICAL CO., LTD., Osaka (JP)

(72) Inventors: Kazui Omokawa, Fukuchiyama (JP); Yuma Negishi, Fukuchiyama (JP); Yasuhiro Fuma, Kawasaki (JP)

(73) Assignee: FUSO CHEMICAL CO., LTD., Osaka (JP)

( * ) Notice: Subject to any disclaimer, the term of this patent is extended or adjusted under 35 U.S.C. 154(b) by 521 days.

(21) Appl. No.: 17/436,143

(22) PCT Filed: Feb. 26, 2020

(86) PCT No.: PCT/JP2020/007587
§ 371 (c)(1),
(2) Date: Sep. 3, 2021

(87) PCT Pub. No.: WO2020/179559
PCT Pub. Date: Sep. 10, 2020

(65) Prior Publication Data
US 2022/0128914 A1    Apr. 28, 2022

(30) Foreign Application Priority Data
Mar. 6, 2019  (JP) ................. 2019-040722

(51) Int. Cl.
*G03G 9/08*    (2006.01)
(52) U.S. Cl.
CPC .................... *G03G 9/0819* (2013.01)
(58) Field of Classification Search
CPC .................................... G03G 9/0819
See application file for complete search history.

(56) References Cited

U.S. PATENT DOCUMENTS

| | | | | |
|---|---|---|---|---|
| 4,845,004 A | * | 7/1989 | Kobayashi | G03G 9/09716 430/108.7 |
| 5,721,083 A | * | 2/1998 | Masuda | G03G 9/091 430/108.7 |
| 2005/0026062 A1 | | 2/2005 | Komoto et al. | |
| 2006/0171872 A1 | | 8/2006 | Adams | |
| 2007/0212632 A1 | * | 9/2007 | Teramoto | G03G 9/0821 430/123.58 |
| 2007/0218387 A1 | | 9/2007 | Ishii et al. | |
| 2008/0069753 A1 | | 3/2008 | Floess et al. | |
| 2009/0143490 A1 | * | 6/2009 | Masuda | C09K 3/1463 516/34 |
| 2011/0318581 A1 | | 12/2011 | Zenitani et al. | |
| 2012/0183777 A1 | | 7/2012 | Yoshikawa et al. | |
| 2012/0323030 A1 | | 12/2012 | Maehara et al. | |
| 2014/0141370 A1 | | 5/2014 | Sasaki et al. | |
| 2014/0147785 A1 | | 5/2014 | Matsushita et al. | |
| 2014/0234626 A1 | | 8/2014 | Yoshikawa et al. | |
| 2015/0056119 A1 | | 2/2015 | Maehara et al. | |
| 2016/0187799 A1 | | 6/2016 | Hiroshi et al. | |

FOREIGN PATENT DOCUMENTS

| | | |
|---|---|---|
| CN | 1577120 A | 2/2005 |
| CN | 101271287 A | 9/2008 |
| CN | 102502663 A | 6/2012 |
| CN | 102675970 A | 9/2012 |
| CN | 103838096 A | 6/2014 |
| CN | 106745001 A | 5/2017 |
| JP | 2012-006796 A | 1/2012 |
| JP | 2012-031045 A | 2/2012 |
| JP | 2012-149169 A | 8/2012 |
| JP | 2013-018690 A | 1/2013 |
| JP | 2013-139389 A | 7/2013 |
| JP | 2013-216506 A | 10/2013 |
| JP | 2014136670 A * | 7/2014 |
| JP | 2015-000844 A | 1/2015 |
| JP | 2015029986 A * | 2/2015 |
| JP | 2015-214433 A | 12/2015 |
| JP | 2016-126099 A | 7/2016 |
| JP | 2017058465 A * | 3/2017 |
| KR | 10-2009-0055966 A | 6/2009 |
| TW | 201525621 A | 7/2015 |
| WO | 2013/018704 A1 | 2/2013 |

OTHER PUBLICATIONS

English machine translation of the description of JP-2014136670-A (Year: 2014).*
English machine translation of the description of JP-2017058465-A (Year: 2017).*
English machine translation of the description of JP-2015029986-A (Year: 2015).*
International Search Report dated Apr. 28, 2020, issued in counterpart application No. PCT/JP2020/007587 (2 pages).
Zhu, Jianjun et al.; Synthesis and Characterization of Superhydrophobic Mesoporous Silica Aerogels By Ambient Pressure Drying, Journal of the Chinese Ceramic Society, vol. 37, No. 4, Apr. 2009, pp. 512-515, with machine translation. (4 pages) cited in CN Office Action dated Dec. 4, 2023.
Roa, Venkateswara A . . . et al., Imperviousness of the hydrophobic silica aerogels against various solvents and acids, Applied Surface Science, 2007, vol. 253, pp. 4137-4141 with machine translation. (5 pages) cited in CN Office Action dated Dec. 4, 2023.

* cited by examiner

*Primary Examiner* — Peter L Vajda
*Assistant Examiner* — Boone Alexander Evans
(74) *Attorney, Agent, or Firm* — WHDA, LLP

(57) ABSTRACT

The present invention provides a hydrophobic silica powder having a small particle size, a narrow particle size distribution, and a high hydrophobicity, and containing a very small amount of organic acid, and toner resin particles having the hydrophobic silica powder on the surface thereof. A hydrophobic silica powder having a particle size ($D_{50}$) as measured by a laser diffraction method of 300 nm or less, a particle size distribution index ($D_{90}/D_{10}$) of 3.0 or less, a hydrophobicity of 60% by volume or more, and an organic acid content of 1 to 300 ppm.

7 Claims, No Drawings

HYDROPHOBIC SILICA POWDER AND TONER RESIN PARTICLE

TECHNICAL FIELD

The present invention relates to a hydrophobic silica powder, and toner resin particles.

BACKGROUND ART

A hydrophobic silica powder is obtained, for example, by adding a hydrophobizing agent to a dispersion of silica particles that are obtained by a sol-gel method (i.e., colloidal silica) to hydrophobize the surface of the silica particles (e.g., Patent Literature 1 to 3). Such a hydrophobization treatment is referred to as "wet hydrophobization treatment" because the subject to be treated is dispersed in a liquid.

In PTL 1, a wet hydrophobization treatment is performed under the conditions of reacting a hydrophobizing agent in an amount of 30 mass % relative to silica in colloidal silica at 35° C. for 1 hour. The hydrophobic silica powder obtained by such a treatment achieves a hydrophobicity of 27 to 61% by volume.

In PTL 2, a wet hydrophobization treatment is performed under conditions of reacting a hydrophobizing agent in an amount of 20 mass % relative to silica in colloidal silica at 65° C. However, the hydrophobic silica powder obtained by such a treatment does not attain sufficiently high hydrophobicity, because it is dispersed in a mixture of 40 g of water and 1 g of methanol in the dispersibility test of primary particles described in PTL 2.

In PTL 3, 2-propanol and then octyltriethoxysilane are added to an acidic aqueous dispersion of silica (about pH 3) for reaction; and an aqueous solution of ammonium hydroxide is added to the resulting reaction mixture, followed by stirring with heating and spray-drying, thus obtaining a hydrophobic silica powder.

A hydrophobic silica powder can also be obtained, for example, by reacting a hydrophilic silica powder obtained by distilling off a solvent from colloidal silica, or a silica powder obtained by the oxidation reaction of a metallic silicone with a hydrophobizing agent to hydrophobize the surface of the silica powder (e.g., PTL 4 and 5). Such a hydrophobization treatment is referred to as "dry hydrophobization treatment" because the subject to be treated is a powder.

CITATION LIST

Patent Literature

PTL 1: JP2012-031045A
PTL 2: JP2012-006796A
PTL 3: JP2013-139389A
PTL 4: JP2012-149169A
PTL 5: WO2013/018704A

SUMMARY OF INVENTION

Technical Problem

In the wet hydrophobization treatment method of PTL 1, a coagulant is added after the wet hydrophobization treatment to obtain silica powder by filtration; however, in this method, aggregates of silica particles easily occur, which increases the content of coarse particles in the hydrophobic silica powder. In addition, the wet hydrophobization treatment method of PTL 2 does not ensure sufficiently high hydrophobicity.

In the wet hydrophobization treatment method of PTL 3, aggregates of silica particles easily occur; this increases the particle size of the hydrophobic silica powder, and results in poor dispersibility of the powder itself.

In hydrophobic silica powders obtained by the dry hydrophobization treatment described in PTL 4 and 5, silica particles are aggregated by the dry hydrophobization treatment, and the content of coarse particles in the hydrophobic silica powder is increased.

When such hydrophobic silica powders are used as external additives of toner resin particles, uniformly dispersing silica particles on the surface of the toner resin particles becomes difficult; and a larger amount of silica powder is required to coat the surface of the toner resin particles, which results in poor economic efficiency.

An object of the present invention is to provide a hydrophobic silica powder having a small particle size, a narrow particle size distribution, and a high hydrophobicity, and containing a very small amount of organic acid, and toner resin particles having the hydrophobic silica powder on the surface thereof.

Solution to Problem

As a result of extensive research to achieve the above object, the present inventors found the following. By adding a small amount of organic acid in a wet hydrophobization treatment of colloidal silica, a highly hydrophobized hydrophobic silica powder can be obtained even though the saturated water content is high. The thus-obtained hydrophobic silica powder has excellent disintegrability into primary particles, and the particle size distribution of the entire powder can be narrowed by reducing the content of coarse particles. For example, the present inventors found that the hydrophobic silica powder can be uniformly dispersed on the surface of toner resin particles. Based on this finding, the inventors conducted further research, and accomplished the present invention.

Specifically, the present invention includes the following aspects.

1. A hydrophobic silica powder having a particle size ($D_{50}$) as measured by a laser diffraction method of 300 nm or less, a particle size distribution index ($D_{90}/D_{10}$) of 3.0 or less, a hydrophobicity of 60% by volume or more, and an organic acid content of 1 to 300 ppm.
2. The hydrophobic silica powder according to Item 1, having a hydrophobicity of 65% by volume or more.
3. The hydrophobic silica powder according to Item 1 or 2, having a saturated water content of 4.0 mass % or more.
4. The hydrophobic silica powder according to any one of Items 1 to 3, having a peak whose middle value in the chemical shift falls within the range of 10 to 15 ppm in a $^{29}$Si-solid NMR spectrum.
5. A toner resin particle comprising the hydrophobic silica powder according to any one of Items 1 to 4 on the surface of the toner resin particle.

Advantageous Effects of Invention

According to the present invention, a hydrophobic silica powder having a small particle size, a narrow particle size distribution, and a high hydrophobicity, and containing a very small amount of organic acid can be provided. Such a hydrophobic silica powder is extremely useful as an external additive of toner resin particles.

DESCRIPTION OF EMBODIMENTS

Below, the hydrophobic silica powder and toner resin particles according to the present invention are described in detail.

Hydrophobic Silica Powder

The hydrophobic silica powder has the following properties (1) to (4):
 (1) the particle size ($D_{50}$) measured by a laser diffraction method is 300 nm or less,
 (2) the particle size distribution index ($D_{90}/D_{10}$) is 3.0 or less,
 (3) the hydrophobicity is 60% by volume or more, and
 (4) the organic acid content is 1 to 300 ppm.

(1) Particle Size ($D_{50}$)

The $D_{50}$ of the hydrophobic silica powder according to the present invention is 300 nm or less. The upper limit of the $D_{50}$ of the hydrophobic silica powder is preferably 250 nm, and more preferably 220 nm, from the viewpoint of uniformly coating the surface of toner resin particles. The lower limit of $D_{50}$ of the hydrophobic silica powder is not particularly limited, and is usually about 10 nm, preferably 30 nm, more preferably 50 nm, and even more preferably 70 nm.

The $D_{50}$ of the hydrophobic silica powder can be determined by a laser diffraction method using a conventional laser diffraction particle size analyzer. Specifically, by comparing the pattern of scattered light intensity of hydrophobic silica powder irradiated with a semiconductor laser (e.g., wavelength: 650 nm) and the theoretical pattern of scattered light intensity obtained from the Mie scattering theory, the volume-based particle size distribution of hydrophobic silica powder is obtained. The median value of the particle size distribution is calculated, thus obtaining $D_{50}$.

In the measurement of $D_{50}$ of the hydrophobic silica powder, the hydrophobic silica powder is added to ethanol, and the ethanol dispersion irradiated with an ultrasonic wave at an output of 10 W for 1 minute is used as a measurement sample. The specified ultrasonic irradiation conditions are relatively weak dispersion conditions; the hydrophobic silica powder primarily dispersed under such conditions has poor aggregation properties between particles. Such a hydrophobic silica powder contains few aggregates, and is uniformly dispersed on the surface of toner resin particles when added to the toner resin particles.

(2) Particle Size Distribution Index ($D_{90}/D_{10}$)

The $D_{90}/D_{10}$ of the hydrophobic silica powder of the present invention is 3.0 or less. The smaller the value of $D_{90}/D_{10}$ of the hydrophobic silica powder, the narrower the particle size distribution (or the smaller the content of coarse particles). The upper limit of $D_{90}/D_{10}$ of the hydrophobic silica powder is preferably 2.8, and more preferably 2.6. The lower limit of $D_{90}/D_{10}$ of the hydrophobic silica powder is not particularly limited, and is usually about 1.5.

As in the same manner as $D_{50}$, The $D_{90}/D_{10}$ of the hydrophobic silica powder can be calculated based on the volume-based particle size distribution, which is obtained by a conventional laser diffraction particle size analyzer.

(3) Hydrophobicity

The hydrophobic silica powder according to the present invention is highly hydrophobized, and has a hydrophobicity of 60% by volume or more. The lower limit of hydrophobicity of the hydrophobic silica powder is preferably 65% by volume, more preferably 68% by volume, and even more preferably 70% by volume. The upper limit of hydrophobicity of the hydrophobic silica powder is not particularly limited, and is usually about 99% by volume.

The hydrophobicity of the hydrophobic silica powder is calculated as follows. 0.2 g of a powder sample is added to 50 mL of pure water, and methanol is added in the liquid while stirring the mixture with a magnet stirrer. The amount of methanol added until the hydrophobic silica powder is completely dispersed is determined to be X mL. The hydrophobicity is calculated using the following equation: $[X/(50+X)] \times 100$ (4) Organic Acid Content The hydrophobic silica powder of the present invention comprises a very small amount of organic acid. The organic acid content is 1 to 300 ppm, preferably 5 to 200 ppm, and more preferably 10 to 100 ppm, relative to the hydrophobic silica powder. When the organic acid content is within the above range, the hydrophobic silica powder exhibits much higher hydrophobicity, and excellent disintegrability.

The organic acid content is calculated by quantifying an organic acid in an extraction liquid prepared by wetting a powder sample in methanol and then adding pure water thereto. Specifically, after 3 mL of methanol is added to 0.3 g of a powder sample, 27 mL of pure water is added, and the mixture is shaken for 1 hour at room temperature. The extraction liquid is filtered, and then the organic acid in the extraction liquid is quantified by ion chromatography (Yppm). The organic acid content in the hydrophobic silica powder is calculated by the formula: $(Y)/(\text{mass of powder sample (g)}) \times \{(\text{mass of methanol (g)}) + (\text{mass of water (g)})\}$.

The organic acid may have one or two or more acid groups. Examples of the organic acid include carboxylic acid and sulfonic acid. The organic acid may be hydroxy acid. Examples of the organic acid include formic acid, acetic acid, citric acid, malic acid, oxalic acid, methanesulfonic acid, or combinations thereof. Of these, carboxylic acid having 1 to 3 carbon atoms is preferred, and acetic acid is more preferred.

The boiling point (boiling point at normal pressure) of the organic acid is not particularly limited. It is preferably 100° C. or more, and more preferably 110° C. or more. The boiling point of the organic acid is preferably 200° C. or less, and more preferably 150° C. or less.

In addition to the properties (1) to (4) above, the hydrophobic silica powder may also have other properties. Examples of other properties include the following properties (5) to (10).

(5) Saturated Water Content

The saturated water content of the hydrophobic silica powder of the present invention is 4.0 mass % or more. The lower limit of the saturated water content of the hydrophobic silica powder is preferably 4.5 mass %, and more preferably 5.0 mass %. In the present invention, the hydrophobicity can be increased even though the saturated water content is high. The upper limit of the saturated water content of the hydrophobic silica powder is not particularly limited, and is usually about 15 mass %, and more preferably 12 mass %.

The saturated water content of the hydrophobic silica powder can be measured as follows. 2.0 g of a powder sample is precisely weighed and placed in a Petri dish, followed by moisture absorption at 60° C. and 80% RH for 48 hours. Thereafter, titration is performed for 10 minutes with an ADP-611 moisture vaporizer (produced by Kyoto Electronics Manufacturing Co., Ltd.) and an MKV-710S Karl Fischer moisture meter (produced by Kyoto Electronics Manufacturing Co., Ltd.).

Specifically, the saturated water content is calculated by the following equation.

Saturated water content (mass %)=(Titer of titrant (mg/mL))×(Titration volume (mL))/(Amount of powder sample (g))×0.1

(6) $^{29}$Si-Solid NMR Spectrum

In the $^{29}$Si-solid NMR spectrum of the hydrophobic silica powder, it is preferable that the peak whose middle value in the chemical shift falls within the range of 10 to 15 ppm is present. The peak is derived from structure M represented by the following formula:

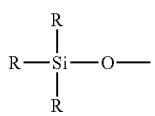

wherein R is a non-hydrolyzable group such as a hydrogen atom or an alkyl group. The presence of structure M in the chemical structure of the silica powder can further increase hydrophobicity and disintegrability.

In the $^{29}$Si-solid NMR spectrum of the hydrophobic silica powder, it is preferable that the peak whose middle value in the chemical shift falls within the range of −70 to −50 ppm is not present. The peak is derived from structure T represented by the following formula:

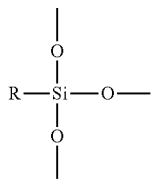

wherein R is as defined above. From the viewpoint of reducing the content of coarse particles in the silica powder, it is preferable that structure T is not present in the chemical structure of the silica powder.

(7) Content of Coarse Particles

Coarse particles are those having a particle size 10 times or more larger than the median diameter measured by the laser diffraction method. The upper limit of the content of coarse particles in the hydrophobic silica powder is preferably 10% by volume, more preferably 8% by volume, and even more preferably 5% by volume. The lower limit of the content of coarse particles in the hydrophobic silica powder is not particularly limited, and is usually about 1% by volume.

As in (1) and (2) above, the content of coarse particles can be calculated by obtaining the volume-based particle size distribution using a conventional laser diffraction particle size analyzer, and using the formula: 100-(integrated frequency (%) at a particle size 10 times the median diameter).

(8) Dispersibility

The hydrophobic silica powder is preferably dispersed in ethanol by irradiating the hydrophobic silica powder with an ultrasonic wave at an output of 10 W for one minute. Such a hydrophobic silica powder contains few aggregates, and is uniformly dispersed on the surface of toner resin particles when added to the toner resin particles.

(9) Long Diameter/Short Diameter (Degree of Deformity)

Although the long diameter/short diameter of the hydrophobic silica powder is not particularly limited, it is preferably 1.00 or more, more preferably 1.03 or more, and even more preferably 1.05 or more. The long diameter/short diameter of the hydrophobic silica powder is preferably 2.00 or less, more preferably 1.80 or less, and even more preferably 1.50 or less. In general, a hydrophobic silica powder with high deformability tends to easily aggregate; thus, when it is used as an external additive of the toner resin particles, uniformly dispersing silica particles on the surface of toner resin particles is difficult. However, the hydrophobic silica powder of the present invention has suppressed aggregation; thus, silica particles can be uniformly dispersed on the surface of toner resin particles.

The long diameter/short diameter of the hydrophobic silica powder is obtained as follows. 100 hydrophobic silica particles are observed with a scanning electron microscope; and according to image analysis, the ratio of the maximum length (absolute maximum length) of an individual particle to the shortest distance (diagonal width) between two straight lines when the particles are sandwiched between two straight lines parallel to the absolute maximum length is calculated, followed by averaging.

(10) Circularity

The circularity of the hydrophobic silica powder is not particularly limited. It is preferably 0.98 or less, more preferably 0.96 or less, and even more preferably 0.94 or less. The circularity of the hydrophobic silica powder is preferably 0.50 or more, more preferably 0.60 or more, and even more preferably 0.70 or more.

The circularity of the hydrophobic silica powder is calculated as follows. 100 Hydrophobic silica particles are observed with a scanning electron microscope; according to image analysis, calculation is conducted based on the area and perimeter of an individual particle using the formula: $4\pi \times area/(perimeter)^2$, followed by averaging.

The hydrophobic silica powder preferably has any one of the properties (5) to (10) above, and more preferably all of the properties (5) to (10) above.

Method of Producing Hydrophobic Silica Powder

The method of producing hydrophobic silica powder is not particularly limited. For example, the production method includes the steps of:

(I) preparing colloidal silica, (II) hydrophobizing the colloidal silica to prepare a mixture of hydrophobic silica particles, (III) removing a solvent from the mixture of the hydrophobic silica particles to prepare a hydrophobic silica powder, and (IV) grinding the hydrophobic silica powder.

Step (I)

Step (I) is a step for preparing colloidal silica. Colloidal silica is usually prepared by a sol-gel method (in particular, the Stöber method). Step (I) preferably includes the following steps (i) to (iii):

(i) preparing a mother liquor containing an alkaline catalyst and water, (ii) adding liquid A containing an alkoxysilane or a hydrolysis product thereof to the mother liquor, and (iii) adding liquid B containing an alkaline catalyst and water to the mother liquor.

Step (i)

Step (i) is a step for preparing a mother liquor containing an alkaline catalyst and water. Such a mother liquor can be prepared, for example, by adding an alkaline catalyst to water.

The type of the alkaline catalyst is not particularly limited. As the alkaline catalyst, an organic base catalyst that does not contain a metal component is preferred in terms of avoiding the contamination of a metal impurity. Of these, a nitrogen-containing organic base catalyst is particularly preferred. Examples of such an organic base catalyst include nitrogen-containing organic base catalysts, such as ethylenediamine, diethylenetriamine, triethylenetetramine, ammonia, urea, monoethanolamine, diethanolamine, triethanolamine, 3-ethoxypropylamine, tetramethylammonium hydroxide, and tetramethylguanidine.

These alkaline catalysts can be used singly, or in a combination of two or more. It is preferable that the amount of the alkaline catalyst to be added is suitably set so that the pH of the mother liquor is usually in the range of 7 to 14. The pH is preferably 9 to 12, and more preferably 9 to 11. The pH of the mother liquor within the above range is more preferred because the particle size and shape can be easily controlled.

The mother liquor can be a mixture of water and an organic solvent. Specifically, the mother liquor may further contain an organic solvent. The organic solvent is typically a water-soluble organic solvent, and examples thereof include alcohols and the like. Preferable examples of alcohols include lower alcohols (particularly alcohols with 1 to 3 carbon atoms) such as methanol, ethanol, and isopropanol, because they are easily distilled off by heat distillation. Methanol is more preferred, and use of an alcohol of the same type as the alcohol produced by the hydrolysis of alkoxysilane is more preferred. This facilitates the recovery and reuse of the solvent. The organic solvents may be used singly, or in a combination of two or more.

The amounts of water and the organic solvent to be added are not particularly limited. For example, the amount of water is 2 to 15 moles, and the amount of the organic solvent is 0 to 50 moles, per mole of alkoxysilane to be used.

For certain amounts of water and an organic solvent, if the amount of water relatively increases, the silica particles to be produced tend to be larger; and if the amount of water relatively decreases, the silica particles to be produced tend to be smaller. Use of the organic solvent in an amount of 5 moles or more ensures excellent compatibility with alkoxysilane, and use of the organic solvent in an amount of 50 moles or less ensures high production efficiency. Thus, by adjusting the mixing ratio of water and the organic solvent, the stability of alkoxysilane or its hydrolysis product can be adjusted, and characteristics such as the particle size of the silica particles can be adjusted as desired.

Step (ii)

Step (ii) is a step for adding liquid A containing an alkoxysilane or a hydrolysis product thereof to the mother liquor.

Examples of the alkoxysilane include hydrolyzable silicon compounds, e.g., tetraalkoxysilanes such as tetramethoxysilane, tetraethoxysilane, and tetraisopropoxysilane. Of these, an alkoxy group with 1 to 8 carbon atoms is preferred, an alkoxy group with 1 to 4 carbon atoms is more preferred, and a tetramethoxysilane and/or tetraethoxysilane with 1 to 2 carbon atoms is even more preferred.

A hydrolyzed alkoxysilane may be used. Alkoxysilanes or hydrolysis products thereof may be used singly, or in a combination of two or more. The alkoxysilane or its hydrolysis product may be added to the mother liquor several times (e.g., two to three times).

The alkoxysilane may be diluted with water or an organic solvent for use. As the organic solvent, the same solvents listed in step (i) can be used. The organic solvent in step (ii) may be the same as or different from the organic solvent in step (i). The diluent of alkoxysilane can be prepared by adding alkoxysilane to water or an organic solvent, or by adding water or an organic solvent to alkoxysilane.

The amount of alkoxysilane or a hydrolysis product thereof is, for example, 70 to 100 parts by mass, and preferably 75 to 90 parts by mass, based on 100 parts by mass of liquid A. The amount of alkoxysilane or the hydrolysis product thereof within the above range is preferred because the particles of alkoxysilane are efficiently produced.

Step (iii)

Step (iii) is a step for adding liquid B containing an alkaline catalyst and water to the mother liquor. The alkaline catalyst can be diluted with water. For example, a diluent can be prepared by adding the alkaline catalyst to water.

The same alkaline catalyst listed in step (i) can be used. The alkaline catalyst in step (iii) may be the same as or different from the alkaline catalyst in step (i).

The amount of liquid B to be added may be suitably determined considering the reaction rates of the hydrolysis and polycondensation reaction of alkoxysilane.

Liquid B may be added gradually, or all at once. Liquid B may be added simultaneously with liquid A.

Step (I) optionally includes the step for concentrating the reaction mixture. Prior to concentration, a very small amount of a water-soluble organic solvent (e.g., alcohol) remaining in the system can be removed in advance, as necessary.

In the concentration of the reaction mixture, once the temperature (temperature in the system) reaches 100° C., the vapor temperature also reaches 100° C., and the completion of removal of the water-soluble organic solvent is confirmed, the reaction solution may be concentrated as is until it has a predetermined solid concentration. Examples of the concentration method include known concentration methods, such as a distillation concentration method and a membrane concentration method.

The concentration of silica in the colloidal silica prepared in step (I) is, for example, 5 to 40 mass %, and preferably 10 to 35 mass %. After the concentrate is filtered through a predetermined filter to remove coarse particles, foreign matter, or the like, it can be used for various applications without any treatments.

The ratio of the average secondary particle size D2 to the average primary particle size D1 of silica particles in the colloidal silica prepared in step (I) (aggregation degree, D2/D1) is not particularly limited. It is preferably 1.0 or more, more preferably 1.3 or more, and even more preferably 1.5 or more. The aggregation degree of silica particles in the colloidal silica is preferably 4.0 or less, more preferably 3.5 or less, and even more preferably 3.3 or less. By using such colloidal silica, a hydrophobic silica powder with high deformability can be easily obtained.

The average secondary particle size (D2) and average primary particle size (D1) can be measured as follows.

Average Primary Particle Size D1

Colloidal silica is pre-dried on a hot plate, and then heated at 800° C. for 1 hour, thus preparing a measurement sample. The BET specific surface area of the prepared measurement sample is measured. The average primary particle size D1 is determined using the formula: 2727/BET specific surface area ($m^2$/g), and the particle density of silica taken as 2.2.

Average Secondary Particle Size D2

Colloidal silica is added to a 0.3 mass % citric acid aqueous solution, and homogenized to prepare a dynamic-light-scattering measurement sample. The average secondary particle size D2 (nm) of the measurement sample is measured by dynamic light scattering (ELSZ-2000S, produced by Otsuka Electronics Co., Ltd.).

Step (II)

Step (II) is a step for hydrophobizing the colloidal silica to prepare a mixture of hydrophobic silica particles. The method of hydrophobizing colloidal silica includes adding a hydrophobizing agent and an organic acid to the colloidal silica prepared in step (I), followed by heating.

In this specification, examples of the "hydrophobizing agent" include known hydrophobizing agents, such as silicone oil, silane coupling agents, and silylating agents (e.g., organosilazanes). Of these, silane coupling agents and silylating agents such as organosilazanes are preferred from the viewpoint of highly hydrophobizing the surface of silica particles, and silylating agents such as organosilazanes are further preferred from the viewpoint of disintegrability of the silica powder.

The "silylating agents" in this specification include silylating agents capable of introducing the structure of formula mentioned above, i.e.,

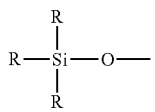

to the surface of silica particles, and examples include tetramethyldisilazane and hexamethyldisilazane, which are organosilazanes; trimethylsilanol, triethylsilanol, and like monosilanol compounds, which are monofunctional silane compounds; trimethyl chlorosilane, triethyl chlorosilane, and like monochlorosilanes; trimethyl methoxysilane, trimethyl ethoxysilane, and like monoalkoxysilanes. Of these, preferable examples include hexamethyldisilazane, trimethylsilanol, and trimethylmethoxysilane; and particularly preferable examples include hexamethyldisilazane.

Hydrophobizing agents can be used alone, or in a combination of two or more. Although the amount of the hydrophobizing agent to be added is not particularly limited, it is preferably 3 to 30 parts by mass, more preferably 5 to 25 parts by mass, and even more preferably 8 to 20 parts by mass, based on 100 parts by mass of the colloidal silica prepared in step (I), from the viewpoint of obtaining higher hydrophobicity.

If necessary, the hydrophobizing agent can also contain a water-soluble organic solvent as a compatibilizing solvent in order to render the hydrophobizing agent compatible with the colloidal silica. Examples of the water-soluble organic solvents include methanol, ethanol, isopropanol, acetone, and the like. Although the concentration of the water-soluble organic solvent is not particularly limited, it is usually 0.1 to 50 mass %, and preferably 0.5 to 30 mass % relative to the colloidal silica.

As the organic acid, components listed in Item (4) above can be used. A carboxylic acid having 1 to 3 carbon atoms is preferred, and acetic acid is more preferred, because it dissolves in water and a lower alcohol. The amount of the organic acid to be added is not particularly limited. When the organic acid is added so that the organic acid content falls the range in Item (4) above, a hydrophobic silica powder with a higher hydrophobicity and excellent disintegrability can be obtained. Specifically, the amount of the organic acid to be added is preferably 0.01 to 5 parts by mass, more preferably 0.05 to 1 part by mass, and even more preferably 0.1 to 0.5 parts by mass, based on the solids content of the colloidal silica prepared in step (I) defined as 100 parts by mass.

The heating temperature is not particularly limited. From the viewpoint of obtaining higher hydrophobicity, it is preferably 50° C. or more, more preferably 60° C. or more, and even more preferably 70° C. or more. The upper limit of the heating temperature is not particularly limited, and is usually about 90° C.

The heating time is not particularly limited. From the viewpoint of obtaining higher hydrophobicity, it is preferably 60 to 600 minutes, more preferably 90 to 500 minutes, and even more preferably 120 to 450 minutes.

Step (III)

Step (III) is a step for forming the mixture of hydrophobic silica particles into a powder to prepare a hydrophobic silica powder. The method of forming the mixture of hydrophobic silica particles into a powder is not particularly limited, and drying may be performed by a conventionally known drying method. For example, the method of drying the mixture of hydrophobic silica particles until the water content is, for example, 3 mass % or less, and preferably 1 mass % or less is used. Drying is usually performed using a dryer.

Step (IV)

Step (IV) is a step for grinding the hydrophobic silica powder. The method of grinding the hydrophobic silica powder is not particularly limited, and grinding may be performed by a conventionally known grinding method. Examples of the grinding method include jet milling and the like. In jet milling, the pusher nozzle pressure is not particularly limited; and is, for example, 0.5 to 2.0 MPa, and preferably 1.0 to 1.5 MPa. The grinding pressure is not particularly limited; and is, for example, 0.05 to 0.5 MPa, and preferably 0.1 to 0.3 MPa. Grinding may be repeated; however, it may also be performed only once, because the hydrophobic silica powder has excellent disintegrability into primary particles.

Toner Resin Particles

The toner resin particles according to the present invention are those containing the hydrophobic silica powder on the surface of the particles.

The resin particles for use in forming toner resin particles may be conventionally known resin particles used for toner resin particles. Examples of such resin particles include polyester resin particles and vinyl resin particles. Of these, polyester resin particles are preferred.

The glass transition temperature (Tg) of the polyester resin is preferably 40° C. or more and 80° C. or less. The glass transition temperature within the above range makes it easier to maintain a minimum fixing temperature.

The polyester resin preferably has a weight average molecular weight (Mw) of 5,000 or more and 40,000 or less. The polyester resin preferably has a number average molecular weight (Mn) of 2,000 or more and 10,000 or less.

Any methods can be used as a method of making a hydrophobic silica powder present on the surface of toner resin particles (or as a method of dispersing a hydrophobic silica powder on the surface of toner resin particles). Examples include a method of externally adding a hydrophobic silica powder to toner resin particles. As such a method, a method of externally adding a hydrophobic silica powder using a "surface modification device," such as a Henschel mixer, a V-blender, a Lödige mixer, and a hybridizer, which are normal mixers for powders. The external addition may be performed so that a hydrophobic silica powder is adhered to the surface of the toner resin particles, or so that part of the toner hydrophobic silica powder is embedded in the toner resin particles.

The volume average particle size ($D_{50}v$) of toner resin particles is preferably 2 µm or more and 10 µm or less; and more preferably 4 µm or more and 8 µm or less. When the volume average particle size is 2 µm or more, the toner has excellent flowability, and enables a carrier to impart sufficient charge properties. When the volume average particle size is 10 µm or less, a high-quality image can be obtained.

The amount of the hydrophobic silica powder to be added to the toner resin particles is preferably 0.01 to 5 parts by mass, and more preferably 1 to 3 parts by mass based on 100 parts by mass of components other than the external additive of the toner resin particles. In the present invention, the entire surface of the toner resin particles can be uniformly coated with a small amount of hydrophobic silica powder.

Although embodiments of the present invention are described above, the present invention is not limited to these embodiments. The present invention may be performed with various modifications, without departing from the spirit and principal concept of the invention.

EXAMPLES

Below, the present invention is described in more detail with reference to Examples. However, the present invention is not limited to these Examples.

Particle Size Measurement by Laser Diffraction Method

The particle size of the hydrophobic silica powder was measured using an LA-950V2 (produced by Horiba Ltd.) laser diffraction particle size analyzer. The hydrophobic silica powder was added to ethanol so that a laser transmittance of 93.0 to 95.0% was achieved, and was irradiated with an ultrasonic wave at an intensity of 3 (output: 10 W) for one minute. The dispersion was measured under the conditions of a silica refractive index of 1.45 and an ethanol refractive index of 1.36, and the median value of the obtained volume standard particle size distribution was determined to be the particle size ($D_{50}$).

The ratio of 90% volume diameter $D_{90}$ to 10% volume diameter $D_{10}$ in this case was defined as a particle size distribution index, and the volume % of particles with a particle size 10 times or more the median diameter was defined as the content of coarse particles. The particle size distribution index and the content of coarse particles were calculated as follows.

Particle size distribution index=$D_{90}/D_{10}$

Content of coarse particles (%)=100−(integrated frequency (%) at a particle size 10 times the median diameter).

Hydrophobicity 50 mL of pure water was placed in a 300-mL beaker; and 0.2 g of a hydrophobic silica powder was added thereto, followed by stirring with a magnet stirrer. The tip of a burette containing methanol was inserted into the liquid, and methanol was added dropwise with stirring. The hydrophobicity was calculated from the amount (X mL) of methanol required to completely disperse the hydrophobic silica powder in water. Specifically, the hydrophobicity was calculated using the following equation.

Hydrophobicity (volume %)=[(X)/(50+X)]×100

Organic Acid Content 3 mL of methanol was added to 0.3 g of a powder sample, and the mixture was shaken. 27 mL of pure water was then added thereto, and the mixture was shaken for 1 hour at room temperature. The extraction liquid was filtered through a 0.2 µm filter, and used as a measurement sample. The organic acid (Yppm) in the extraction liquid was quantified by ion chromatography (Thermo Fisher Scientific).

The organic acid content in the hydrophobic silica powder was calculated by the following equation.

Organic acid concentration (ppm)=(Y)/(mass of powder sample (g))×{(mass of methanol (g))+(mass of water (g))}.

Measurement of Saturated Water Content 2.0 g of a hydrophobic silica powder was precisely weighed and placed in a Petri dish, followed by moisture absorption at 60° C. and 80% RH for 48 hours. Thereafter, titration was performed for 10 minutes with an ADP-611 moisture vaporizer (Kyoto Electronics Manufacturing Co., Ltd.) and an MKV-710 Karl Fischer moisture meter (Kyoto Electronics Manufacturing Co., Ltd.). The saturated water content was calculated by the following equation.

Saturated water content (mass %)=(Titer of titrant (mg/mL))×(Titration volume (mL))/(Amount of powder sample (g))×0.1

The average of two measurements was determined to be the saturated water content.

$^{29}$Si-Solid NMR Measurement

The $^{29}$Si-solid NMR spectrum of a hydrophobic silica powder was measured with a JNM-ECA400 (JEOL Ltd.) under the following conditions:
Resonant frequency: 78.65 Hz
Measurement mode: CP/MAS method
Nuclide for measurement: $^{29}$Si
Sample rotation frequency: 6 kHz
Measurement temperature: room temperature
Cumulated number: 16384 times The presence of structure M (10 to 15 ppm) and structure T (−70 to −50 ppm) was checked from the obtained spectra.

Aggregation Degree

The average secondary particle size D2 and the average primary particle size D1 of the colloidal silica concentrate were used to calculate the aggregation degree using the following formula.

Aggregation degree=$D2(nm)/D1(nm)$

The average secondary particle size (D2) and average primary particle size (D1) was measured as follows.

Average Primary Particle Size D1

A colloidal silica concentrate was pre-dried on a hot plate, and then heated at 800° C. for 1 hour, thus preparing a measurement sample. The BET specific surface area of the prepared measurement sample was measured. The value of 2727/BET specific surface area (m²/g) was converted with the particle density of silica taken as 2.2, and determined to be the average primary particle size D1 (nm).

Average Secondary Particle Size D2

A colloidal silica concentrate was added to a 0.3 mass % citric acid aqueous solution, and homogenized to prepare a dynamic-light-scattering measurement sample. The average secondary particle size D2 (nm) of the measurement sample was measured by dynamic light scattering (ELSZ-2000S, produced by Otsuka Electronics Co., Ltd.).

Long Diameter/Short Diameter

The hydrophobic silica powder was observed with a scanning electron microscope, and 100 hydrophobic silica particles were analyzed by image analysis, and the long diameter/short diameter was calculated from the following equation. For the long diameter/short diameter, the average of the values calculated for individual particles was used.
Long diameter/short diameter=absolute maximum length (nm)/diagonal width (nm)
Circularity The hydrophobic silica powder was observed with a scanning electron microscope, 100 hydrophobic silica particles were analyzed by image analysis, and the circularity was calculated from the following equation. For circularity, the average of the values calculated for individual particles was used.

$$\text{Circularity}=4\pi\times\text{area}/(\text{perimeter})^2$$

State of Toner by External Addition

The hydrophobic silica powder was externally added to toner resin particles, and the state of a toner by external addition was evaluated by observing the surface of the sample by SEM.

As toner resin particles, polyester resin particles (produced by Mikasa Sangyo Co., Ltd., average particle size: 9.2 µm) were used. 10 g of a product in which 2 parts by mass of a hydrophobic silica powder was added to 100 parts by mass of toner resin particles was weighed and placed in a 100-mL IBOY wide-mouth bottle, and subjected to shaking at the maximum intensity for 8 minutes using a YS-8D shaking apparatus (produced by Yayoi Co., Ltd.), thus preparing external addition toner particles.

The surface of the external addition toner particles was observed with a scanning electron microscope (JSM-6700, produced by JEOL), and the state of external addition was evaluated from a 50,000× field of view as follows.
- ○: Silica particles are uniformly dispersed.
- Δ: Aggregates of silica particles are slightly observed, or the surface coverage by silica particles is slightly reduced.
- x: Many aggregates of silica particles are observed, or the surface coverage by silica particles is greatly reduced.

Example 1

A mother liquor was prepared by stirring and mixing 327.9 g of pure water, 2704.7 g of methanol, and 86.0 g of 28% aqueous ammonia in a flask. Liquid A, which was prepared using 3292.6 g of tetramethoxysilane (TMOS) and 893.3 g of methanol, and liquid B, which was prepared using 1611.6 g of pure water and 197.8 g of 28% aqueous ammonia, were separately prepared. The above liquid A and liquid B were added to the mother liquor heated to 19° C. for 150 min, thus obtaining colloidal silica 1. Furthermore, the resulting colloidal silica 1 was concentrated to a silica concentration of 20 mass % by distilling colloidal silica 1 below the boiling point, followed by distillation while adding pure water to prepare colloidal silica concentrate 1.

0.3 g of acetic acid and 66.6 g of hexamethyldisilazane (HMDS) were added to 1000.0 g of the colloidal silica concentrate, followed by stirring; and the mixture was heated from room temperature to 80° C. over 60 minutes, and heating was further performed at 80° C. for 100 minutes, thus conducting a hydrophobization treatment. Thereafter, liquid components in the system were distilled off by heating, followed by vacuum-drying until the moisture content was 1 mass % or less. The resultant was subjected to a disintegration treatment once using a jet mill (NJ-50, produced by Tokuju Kosakusho) under the conditions of a pusher nozzle pressure of 1.40 MPa and a grinding pressure of 0.20 MPa, thus obtaining hydrophobic silica powder 1

Examples 2 to 6

Hydrophobic silica powders 2 to 6 in each example were prepared in the same manner as in Example 1, except that the amount and reaction conditions were changed to those shown in Table 1.

Comparative Example 1

Hydrophobic silica powder 7 was prepared in the same manner as in Example 1, except that acetic acid was not added in the hydrophobization treatment using colloidal silica concentrate 1.

Comparative Example 2

Hydrophilic silica powder 1 was prepared by spray-drying the colloidal silica concentrate 1 obtained in Example 1. 30.0 g of hexamethyldisilazane was added to 100.0 g of the hydrophilic silica powder, followed by stirring. The mixture was heated from room temperature to 150° C. over 120 minutes; and heating was further performed at 150° C. for 120 minutes, thus conducting a hydrophobization treatment. After the drying step, the procedure of Example 1 was repeated, thus preparing hydrophobic silica powder 8.

Comparative Example 3

Hydrophobic silica powder 9 was prepared in the same manner as in Comparative Example 2, except that spray-drying was changed to freeze-drying in the preparation of the hydrophilic silica powder of Comparative Example 1.

Comparative Example 4

Hydrophobic silica powder 10 was prepared in the same manner as in Example 1, except that hexyltrimethoxysilane (HexTMS) was used in place of hexamethyldisilazane, and the reaction conditions were changed in the hydrophobization treatment using the colloidal silica concentrate 1.

Comparative Example 5

Commercially available fumed silica SIS6962.0 (produced by Gelest Inc., a hexamethyldisilazane modified product) was used as hydrophobic silica powder 11 for comparison.

Comparative Example 6

Commercially available fumed silica SIS6961 (produced by Gelest Inc., siloxane modified product) was used as hydrophobic silica powder 12 for comparison.

An attempt was made to evaluate the aggregation degree of Comparative Examples 5 and 6 using commercially available fumed silica SIS6960 (produced by Gelest Inc., unmodified); however, evaluation was not conducted, because primary dispersion did not occur in pure water. In Comparative Examples 5 and 6, aggregation occurred, and the long diameter/short diameter and circularity could not be evaluated.

A list of the reaction conditions for the Examples and Comparative Examples is shown in Table 1.

TABLE 1

|  |  |  | Example 1 | Example 2 | Example 3 | Example 4 | Example 5 |
|---|---|---|---|---|---|---|---|
| Particle synthesis | Mother liquor | Pure water, g | 327.9 | 332.7 | 945.1 | 283.5 | 778.7 |
|  |  | Methanol, g | 2704.7 | 2707.9 | 2680.2 | 2595.0 | 3055.9 |
|  |  | 28% Aqueous ammonia, g | 86.0 | 78.0 | 250.3 | 102.5 | 417.5 |
|  | Liquid A | TMOS, g | 3292.6 | 3292.5 | 3018.3 | 3018.3 | 3039.1 |
|  |  | Methanol, g | 893.3 | 893.4 | 818.9 | 818.9 | 824.6 |
|  | Liquid B | Pure water, g | 1611.6 | 1631.6 | 546.0 | 1259.4 | 417.8 |
|  |  | 28% Aqueous ammonia, g | 197.8 | 179.8 | 242.5 | 236.2 | 416.6 |
|  | Reaction conditions | Reaction temperature, °C. | 19.0 | 19.0 | 35.0 | 22.0 | 35.0 |
|  |  | Reaction time, min | 150 | 150 | 300 | 150 | 300 |
| Hydrophobization treatment | Silica source | Form | Colloidal silica concentrate 1 | Colloidal silica concentrate 2 | Colloidal silica concentrate 3 | Colloidal silica concentrate 4 | Colloidal silica concentrate 5 |
|  |  | Addition amount, g | 1000.0 | 1000.0 | 1000.0 | 1000.0 | 1000.0 |
|  |  | Silica (solids content), g | 200.0 | 200.0 | 200.0 | 200.0 | 200.0 |
|  | Acetic acid | Addition amount, g | 0.3 | 0.9 | 0.3 | 0.3 | 0.3 |
|  | Hydrophobizing agent | Reagent name | HMDS | HMDS | HMDS | HMDS | HMDS |
|  |  | Addition amount, g | 66.6 | 50.6 | 66.6 | 66.6 | 66.6 |
|  | Temperature increase | Target temperature, °C. | 80 | 80 | 80 | 80 | 80 |
|  | Reaction | Time, min | 60 | 60 | 60 | 60 | 60 |
|  |  | Reaction temperature, °C. | 80 | 80 | 80 | 80 | 80 |
|  |  | Time, min | 100 | 200 | 100 | 100 | 100 |

|  |  |  | Example 6 | Comparative Example 1 | Comparative Example 2 | Comparative Example 3 | Comparative Example 4 |
|---|---|---|---|---|---|---|---|
| Particle synthesis | Mother liquor | Pure water, g | 205.8 | 327.9 | 327.9 | 327.9 | 327.9 |
|  |  | Methanol, g | 8685.6 | 2704.7 | 2704.7 | 2704.7 | 2704.7 |
|  |  | 28% Aqueous ammonia, g | 585.3 | 86.0 | 86.0 | 86.0 | 86.0 |
|  | Liquid A | TMOS, g | 1014.4 | 3292.6 | 3292.6 | 3292.6 | 3292.6 |
|  |  | Methanol, g | 275.6 | 893.3 | 893.3 | 893.3 | 893.3 |
|  | Liquid B | Pure water, g | 0.0 | 1611.6 | 1611.6 | 1611.6 | 1611.6 |
|  |  | 28% Aqueous ammonia, g | 0.0 | 197.8 | 197.8 | 197.8 | 197.8 |
|  | Reaction conditions | Reaction temperature, °C. | 5.0 | 19.0 | 19.0 | 19.0 | 19.0 |
|  |  | Reaction time, min | 45 | 150 | 150 | 150 | 150 |
| Hydrophobization treatment | Silica source | Form | Colloidal silica concentrate 6 | Colloidal silica concentrate 1 | Hydrophilic silica powder 1 | Hydrophilic silica powder 2 | Colloidal silica concentrate 1 |
|  |  | Addition amount, g | 1000.0 | 1000.0 | 100.0 | 100.0 | 1000.0 |
|  |  | Silica (solids content), g | 200.0 | 200.0 | 100.0 | 100.0 | 200.0 |
|  | Acetic acid | Addition amount, g | 0.3 | 0.0 | 0.0 | 0.0 | 1.0 |
|  | Hydrophobizing agent | Reagent name | HMDS | HMDS | HMDS | HMDS | HexTMS |
|  |  | Addition amount, g | 66.6 | 66.6 | 30 | 30 | 23.4 |
|  | Temperature increase | Target temperature, °C. | 80 | 80 | 150 | 150 | 70 |
|  | Reaction | Time, min | 120 | 80 | 120 | 120 | 75 |
|  |  | Reaction temperature, °C. | 80 | 80 | 150 | 150 | 70 |
|  |  | Time, min | 100 | 100 | 120 | 120 | 180 |

Table 2 shows the evaluation results of the properties of the hydrophobic silica powders in the Examples.

TABLE 2

|  | Example 1 | Example 2 | Example 3 | Example 4 | Example 5 | Example 6 |
|---|---|---|---|---|---|---|
| Silica production method | Wet type | Wet type | Wet type | Wet type | Wet type | Wet type |
| Hydrophobization conditions | Wet type | Wet type | Wet type | Wet type | Wet type | Wet type |
| Solvent removal method | Heat-drying | Heat-drying | Heat-drying | Heat-drying | Heat-drying | Heat-drying |
| Particle size, nm | 167 | 158 | 135 | 207 | 158 | 76 |
| Particle size distribution | 2.40 | 2.48 | 2.22 | 2.54 | 2.18 | 2.12 |
| D90, nm | 254 | 245 | 197 | 323 | 226 | 105 |
| D10, nm | .106 | 99 | 89 | 127 | 103 | 50 |
| Amount of coarse particles, vol % | 3.3 | 2.0 | 0.0 | 3.8 | 0.0 | 0.3 |
| Hydrophobicity, % | 70 | 74 | 77 | 66 | 73 | 77 |
| Saturated water content % | 7.8 | 7.5 | 6.6 | 9.1 | 7.9 | 10.8 |
| Structure M | Present | Present | Present | Present | Present | Present |
| Structure T | Absent | Absent | Absent | Absent | Absent | Absent |
| Organic acid content | 20 | 91 | 45 | 17 | 18 | 20 |
| Aggregation degree | 2.47 | 2.52 | 1.58 | 2.03 | 1.53 | 2.36 |
| Long diameter/short diameter | 1.24 | 1.33 | 1.39 | 1.30 | 1.06 | 1.20 |
| Circularity | 0.86 | 0.74 | 0.86 | 0.85 | 0.94 | 0.87 |
| State of toner by external addition | ? | ? | ? | ? | ? | ? |

Table 3 shows the evaluation results of the properties of the hydrophobic silica powders in the Comparative Examples.

TABLE 3

|  | Comparative Example 1 | Comparative Example 2 | Comparative Example 3 | Comparative Example 4 | Comparative Example 5 | Comparative Example 6 |
|---|---|---|---|---|---|---|
| Silica production method | Wet type | Wet type | Wet type | Wet type | Dry type | Dry type |
| Hydrophobization conditions | Wet type | Dry type | Dry type | Wet type | Dry type | Dry type |
| Solvent removal method | Heat-drying | Spray-drying | Freeze-drying | Heat-drying | — | — |
| Particle size, nm | 29098 | 228 | 182 | 24140 | 10127 | 44281 |
| Particle size distribution | 3.39 | 264.48 | 151.62 | 3.03 | 3.16 | 3.30 |
| D90, μm | 58060 | 34250 | 17148 | 44146 | 18854 | 82506 |
| D10, μm | 17112 | 130 | 113 | 14553 | 5965 | 24975 |
| Amount of coarse particles, vol % | 47.6 | 23.3 | 14.2 | 0.0 | 0.0 | 0.0 |
| Hydrophobicity, % | 56 | 69 | 70 | 80 | 71 | 55 |
| Saturated water content % | 8.8 | 8.7 | 8.7 | 7.6 | 0.3 | 0.5 |
| Structure M | Present | Present | Present | Absent | Present | Absent |
| Structure T | Absent | Absent | Absent | Present | Absent | Absent |
| Organic acid content | 0 | 0 | 0 | 122 | 0 | 0 |
| Aggregation degree | 2.47 | 2.47 | 2.47 | 2.47 | — | — |
| Long diameter/short diameter | 1.24 | 1.24 | 1.24 | 124 | — | — |
| Circularity | 0.86 | 0.86 | 0.86 | 0.86 | — | — |
| State of toner by external addition | Δ | Δ | ? | x | x | x |

The invention claimed is:

1. A hydrophobic silica powder having a particle size ($D_{50}$) as measured by a laser diffraction method of 50 nm or more and 250 nm or less, a particle size distribution index ($D_{90}/D_{10}$) of 3.0 or less, a hydrophobicity of 60% by volume or more, and an organic acid content of 1 to 300 ppm.

2. The hydrophobic silica powder according to claim 1, having a hydrophobicity of 65% by volume or more.

3. The hydrophobic silica powder according to claim 1, having a saturated water content of 4.0 mass % or more.

4. The hydrophobic silica powder according to claim 1, having a peak whose middle value in the chemical shift falls within the range of 10 to 15 ppm in a $^{29}$Si-solid NMR spectrum.

5. A toner resin particle comprising the hydrophobic silica powder according to claim 1 on the surface of the toner resin particle.

6. The hydrophobic silica powder according to claim 1, having a saturated water content of more than 5.0 mass %.

7. The hydrophobic silica powder according to claim 1, having a saturated water content of 6.6 mass % or more.

* * * * *